United States Patent
Chiang

(10) Patent No.: US 9,043,549 B2
(45) Date of Patent: May 26, 2015

(54) MEMORY STORAGE APPARATUS, MEMORY CONTROLLER, AND METHOD FOR TRANSMITTING AND IDENTIFYING DATA STREAM

(75) Inventor: Hsu-Chih Chiang, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 263 days.

(21) Appl. No.: 13/352,287

(22) Filed: Jan. 17, 2012

(65) Prior Publication Data

US 2013/0117507 A1 May 9, 2013

(30) Foreign Application Priority Data

Nov. 4, 2011 (TW) .............................. 100140417 A

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ...... *G06F 12/0866* (2013.01); *G06F 2212/214* (2013.01)

(58) Field of Classification Search
CPC . G06F 11/1004; G06F 9/3004; G06F 13/128; G06F 13/28; G06F 13/38; G06F 13/16
USPC .......................................................... 711/115
See application file for complete search history.

(56) References Cited

U.S. PATENT DOCUMENTS

2004/0049726 A1* 3/2004 Goyins et al. .................. 714/758
2010/0186077 A1* 7/2010 Chang et al. ....................... 726/9

* cited by examiner

*Primary Examiner* — Charles Rones
*Assistant Examiner* — Sidney Li
(74) *Attorney, Agent, or Firm* — Jian Chyun IP Office

(57) ABSTRACT

A memory storage apparatus, a memory controller and method for transmitting and identifying data streams are provided. The memory controller passes at least a portion of a data stream received from a host system to a smart card chip of the memory storage apparatus. Then, the host system accurately receives a response message from the smart card chip by executing a plurality of read commands. The memory controller is capable of adding a first verification code to a response data stream sent to the host system, and is capable of adding a write token to each of data segments of the response data stream. The host system confirms the accuracy of the response data stream by verifying the first verification code or by verifying the write token of each of the data segments.

18 Claims, 10 Drawing Sheets

MEMORY STORAGE APPARATUS, MEMORY CONTROLLER, AND METHOD FOR TRANSMITTING AND IDENTIFYING DATA STREAM

CROSS-REFERENCE TO RELATED APPLICATION

This application claims the priority benefit of Taiwan application serial no. 100140417, filed on Nov. 4, 2011. The entirety of the above-mentioned patent application is hereby incorporated by reference herein and made a part of this specification.

BACKGROUND

1. Technology Field

The present invention relates to a method, a memory storage apparatus and a memory controller for transmitting and identifying data streams, and particularly, to a method, a memory storage apparatus and a memory controller thereof suitable for managing the data stream transmitting between the host system and the memory storage apparatus.

2. Description of Related Art

Along with the widespread of digital cameras, cell phones, and MP3 in recently years, the consumers' demand for storage media has increased drastically. Since a rewritable non-volatile memory is characterized by non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

Furthermore, the user's increasing acceptance of electronic wallet and pre-deposit lead to the popularity of smart cards. A smart card is typically an integrated circuit (IC) chip which includes, for example, a microprocessor, a card operation system, a security module, and a memory module to allow holder of the smart card to perform preset operations. With the ability to provide computation, encryption, bidirectional communication and security functions, the smart card not only records data but also protects the recorded data therein. One exemplary application of the smart card is the subscriber identification module (SIM) of cellular phones that use global system for mobile communication (GSM). However, the smart card has a limit on the storage capacity. Thus, the smart card has recently begun to be combined with a memory card to expand the storage capacity of the smart card.

In the conventional technology, the combination of the flash memory and the smart card uses special commands to distinguish between data transmitted to the smart card and data transmitted to the flash memory. Such special commands may result in the problem that hardware devices or driver programs are unable to support the special commands. In addition, in the conventional technology, type information of the data stream transmitted in the special commands is compared to determine whether the data stream is of the command format of the smart card. However, this method often results in confusion of command data of the smart card with regular file data (i.e., misinterpreting regular file data as data stream of the smart card).

In addition, in applications of electronic products with cache memory, due to the electronic products' own limits, data stream transmitting between the smart card and the electronic products can not bypass the cache memory, preventing a response generated by the smart card from being transmitted without error back to the electronic product that the smart card is attached to and thereby restraining adoption of the smart card on such electronic product having cache memory. For example, in a cell phone with a Java system, since the Java system does not support commands such as Non Cache which allow direct access to non-volatile memory without using cache memory, it is difficult to combine the smart card and the flash memory into a memory card to be adopted in the cell phone with the Java system. FIG. 1 is a functional block diagram of a prior art of a host system 10 equipped with a memory card 12. The host is a type of electronic product (e.g., a cell phone with a Java system) and has a cache memory 14. The memory card 12 includes a flash memory 16 and a smart card chip 18. All data between the host system 10 and the memory card 12 is transmitted through the cache memory 14. However, since the cache memory 14 temporarily records recent data transmitted between the host system 10 and the memory card 12, when the host system 10 acquires data from the smart card chip 18, if the cache memory 14 already contains data matched with the address designated by the read command, the cache memory 14 will transmit the matched data to the host system 10. However, under such structure, the response from the smart card chip 18 is often substituted by the data already in the cache memory 14 and thus the encryption function and communication security offered by the smart card chip 18 are compromised.

Therefore, a system and a method that can accurately transmit the response message of the smart card are required in the relevant combined utilization of the flash memory and the smart card.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention relates to a method, a memory storage apparatus and a memory controller for transmitting and identifying data streams, suitable for the data transmission between the host system and the memory storage apparatus to ensure the correctness of the response data stream received by the host system.

The present invention provides a method for transmitting and identifying data streams, suitable for data transmission between a host system and the memory storage apparatus. The memory storage apparatus has a smart card chip. The method for transmitting and identifying data streams includes: (a) the host system generates and records a write token and embeds the write token in the data stream; (b) the host system transmits a write command to the memory storage apparatus, and the write command is set to write the data stream to the memory storage apparatus; (c) the memory storage apparatus transmits at least a portion of the data stream to the smart card chip, and records the write token of the data stream; (d) the host system sequentially transmits a plurality of read command to the memory storage apparatus until the host system receives a response data stream from the memory storage apparatus, and the response data stream has a response message, a write token and a first verification code, and the response message is generated by the smart card chip in response to the at least a portion of the data stream, and the memory storage apparatus generates the first verification code according to the response message and the write token; (e) the host system extracts the write token, the response message and the first verification code from the received response data stream, and generates a second verification code according to the extracted write token and the extracted response message; and (f) the host system determines whether the extracted first verification code is consistent with the second verification code and determines whether the extracted write token is consistent with the recorded write token, and if the first verification code is consistent with the second verification code and the extracted write token is consistent with the recorded write token, the host system regards the response message of the received response data stream as the response message generated by the smart card chip.

The present invention provides a method for transmitting and identifying data streams, suitable for data transmission between a host system and the memory storage apparatus. The memory storage apparatus has a smart card chip. The method for transmitting and identifying data streams includes: (a) the host system generates and records a write token and embeds the write token in the data stream; (b) the host system transmits a write command to the memory storage apparatus, and the write command is set to write the data stream to the memory storage apparatus; (c) the memory storage apparatus transmits at least a portion of the data stream to the smart card chip, and records the write token of the data stream; (d) the host system sequentially transmits a plurality of read command to the memory storage apparatus until the host system receives a response data stream from the memory storage apparatus, and the response data stream has a response message, which is generated by the smart card chip receiving at least a portion of the data stream, and the response data stream has a plurality of data segments, and each data segment records the write token integrally; (e) the host system extracts the write token from each data segment of the received response data stream; and (f) the host system determines whether each extracted write token is consistent with the recorded write token, and if each extracted write token is consistent with the recorded write token, the host system regards the response message of the received response data stream as the response message generated by the smart card chip.

An exemplary embodiment of the present invention provides a memory storage apparatus including a connector, a rewritable non-volatile memory module, a smart card chip and a memory controller. The connector is configured to be coupled to a host system. The rewritable non-volatile memory module is configured to store data. The smart card chip is configured to generate a response message according to at least a portion of a received data stream. The memory controller is coupled to the connector, the rewritable non-volatile memory module and the smart card chip, and the memory controller is configured to control the operation of the rewritable non-volatile memory module and the smart card chip. The memory controller receives a write command from the host system through the connector. The write command is configured to write the data stream to a logical address. The data stream comprises a write token. The memory controller transmits at least a portion of the data stream to the smart card chip, and records the write token of the data stream. The memory controller receives the response message from the smart card chip. The memory controller generates a first verification code according to the response message and the write token. The memory controller adds the response message, the write token and the first verification code to a response data stream. The memory controller transmits the response data stream to the host system through the connector.

An exemplary embodiment of the present invention provides a memory controller, configured to control the rewritable non-volatile memory module and the smart card chip. The memory controller includes a host interface, a memory interface, a smart card chip interface and a memory management circuit. The host interface is configured to be coupled to a host system. The memory interface is configured to be coupled to the rewritable non-volatile memory module. The smart card chip interface is configured to be coupled to the smart card chip. The memory management circuit is coupled to the host interface, the memory interface and the smart card chip interface. The memory management circuit receives a write command from the host system through the host interface. The write command is set to write the data stream to a logical address. The data stream comprises a write token. The memory management circuit transmits at least a portion of the data stream to the smart card chip through the smart card chip interface, and records the write token of the data stream. The memory management circuit receives a response message from the smart card chip through the smart card chip interface. The memory management circuit adds the response message and the write token to a response data stream. The response data stream comprises a plurality of data segments, and the memory management circuit adds the write token to each of the data segments. The memory management circuit transmits the response data stream to the host system through the host interface.

According to the aforementioned embodiments, the method, the memory storage apparatus and the memory controller for transmitting and identifying data streams are suitable for data transmission between the host system and the memory storage apparatus. Also, the correctness of the response data stream received by the host system is assured.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF THE EMBODIMENTS

Figure 1:
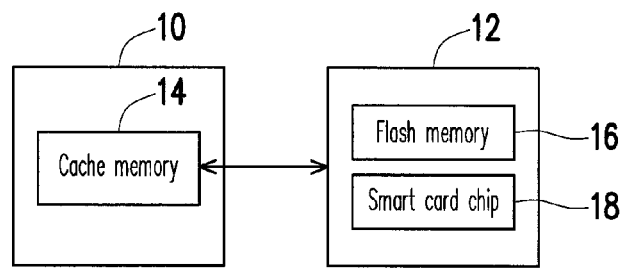
FIG. 1 is a functional block diagram of a prior art of a host system in combination with a memory card.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

The present invention provides a method, a memory storage apparatus and a memory controller for transmitting and identifying data streams, to manage the data transmission between the host system and the memory storage apparatus with a smart card chip. The data stream can be transmitted from the host system to the smart card chip through a write command Generally, a memory storage apparatus (i.e., a memory storage system) includes a rewriteable non-volatile memory module and a memory controller (i.e., a control circuit). The memory storage apparatus is usually used together with a host system, such that the host system can write data into or read data from the memory storage apparatus. It should be noted that the host system may be a cellular phone, a personal digital assistant (PDA), a personal computer, or any other electronic products having a cache memory.

The host system receives a response message generated by the smart card chip accurately by executing a plurality of read commands. A write token is used to examine the accuracy of response message so that the host system can distinguish whether the received response message is an old response message temporarily recorded in the cache memory or a latest response message generated by the smart card chip. Specifically, the cache memory in the present application refers to the memory unit that the host system searches first for data prior to searching the memory storage apparatus when the host system handles the data. In addition, if the data to be searched is temporarily recorded in such cache memory, the host system doesn't have to read data from the memory storage apparatus. Several exemplary embodiments of the present invention are described in the following with reference to the accompanying drawings. It is to be understood that the embodiments do not limit the scope of the present invention.

Figure 2A:
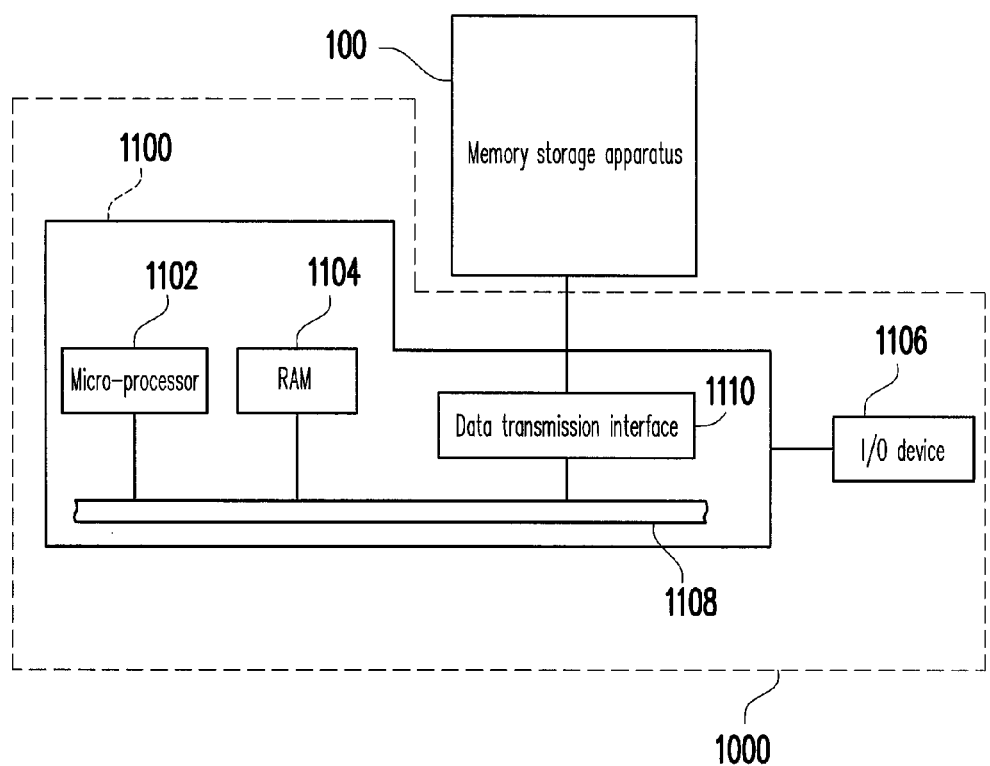
FIG. 2A illustrates a host system and a memory storage apparatus according to a first exemplary embodiment of the invention.

FIG. 2A illustrates a host system and a memory storage apparatus according to a first exemplary embodiment of the invention.

Figure 2B:
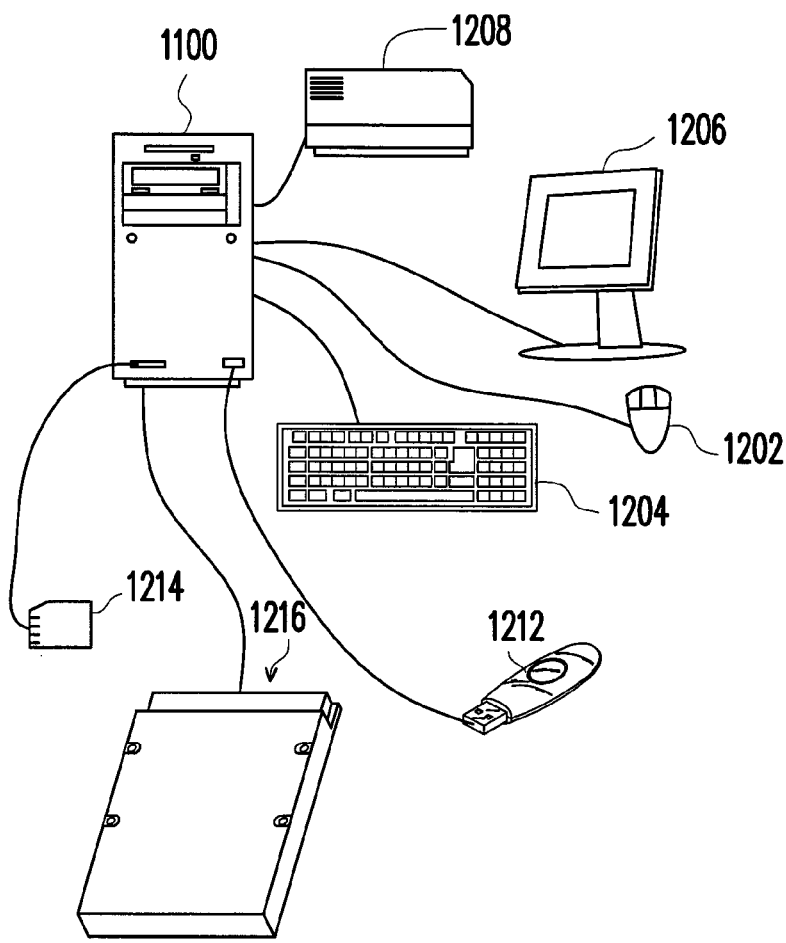
FIG. 2B schematically illustrates a computer, an input/output (I/O) device, and a memory storage apparatus according to the first exemplary embodiment of the invention.

With reference to FIG. 2A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2B. It should be understood that, the devices depicted in FIG. 2B should not be construed as limitations to the present disclosure, and the I/O device 1106 may include other devices as well. For example, the I/O device 1106 may be a touch screen, a keyboard, a button or a switch integrated with the computer 1100.

In an exemplary embodiment of the present disclosure, the memory storage apparatus 100 is coupled to other components of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1212, a memory card 1214, or a solid state drive (SSD) 1216, as shown in FIG. 2B. In the present embodiment, the memory storage apparatus 100 may be a smart card or an integrated secure digital (SD) memory card having a non-volatile memory. It should be noted that in another embodiment of the present invention, the storage device 100 may also be a multimedia card (MMC) memory or other memory devices.

Figure 2C:
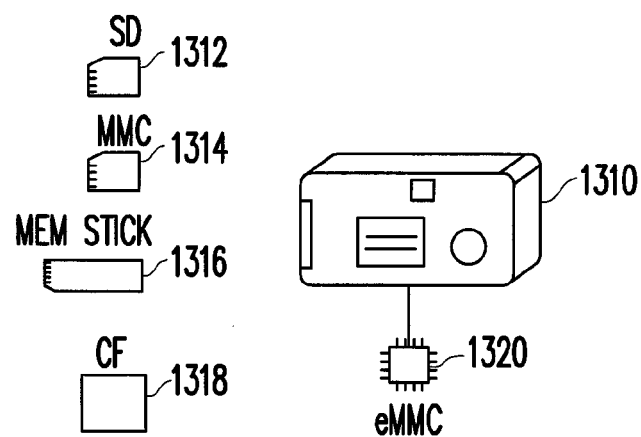
FIG. 2C schematically illustrates a host system and a memory storage apparatus according to another exemplary embodiment of the invention.

Generally, the host system 1000 may substantially be any system suitable to be used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320, as shown in FIG. 2C. The embedded storage device 1320 includes an embedded MMC (eMMC). It should be mentioned that the eMMC is directly coupled to the substrate of the host system.

Figure 3:
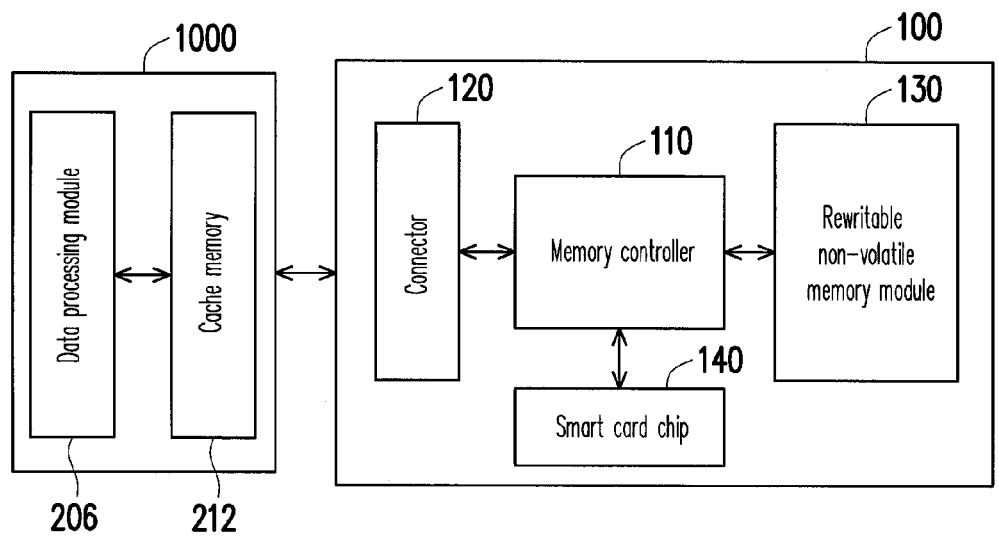
FIG. 3 is a schematic block diagram illustrating the memory storage apparatus depicted in FIG. 1A.

Referring to FIG. 3, FIG. 3 is a functional block diagram illustrating a data processing system according to an embodiment of the present invention. The data processing system adopts the method for transmitting and identifying data stream of the present invention to manage the data transmission between the host system 1000 and the memory storage apparatus 100 with the smart card chip 140. The data processing system includes the host system 1000 and the memory storage apparatus 100. Specifically, the host system 1000 has a data processing module 206, which is used to operate the memory storage apparatus 100 by the host system. The data processing module 206 may be implemented by a software, a firmware or a hardware. In addition, the host system 1000 further includes other components, such as a processor, an operating system, etc. In the present embodiment, all command and data between the host system 1000 and the memory storage apparatus 100 are transmitted through the cache memory 212. Furthermore, the host system 1000 can be a personal computer, a cell phone, a notebook computer, a personal digital assistant (PDA), etc.

In the present embodiment, the memory storage apparatus 100 includes a connector 120, a memory controller 110, a rewritable non-volatile memory module 130 and a smart card chip 140. The memory controller 110 is used to control the operation of the memory storage apparatus 100, and control the data transmission between the memory storage apparatus 100 and the host system 1000. The memory storage apparatus 100 is usually used in combination with the host system 1000, such that the host system 1000 can transmit commands and data to the memory storage apparatus 100.

The memory controller 110 and the host system 1000 transmits the message to the smart card chip 140, and accurately transmits the response message of the smart card chip 140 back to the host system 1000. The cache memory 212 of the host system 1000 temporarily records recently-used data of the host system 1000 so as to increase the overall data processing speed of the host system 1000.

In the present embodiment, the connector 120 is electrically connected to the memory controller 110, and is coupled to the host system 1000, so as to receive commands and data from the host system 1000 and transmit the message of the memory storage apparatus 100 to the host system 1000. In the present exemplary embodiment, the connector 120 complies with a secure digital (SD) interface standard. However, the invention is not limited thereto, and the connector 120 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the serial advanced technology attachment (SATA) standard, the memory stick (MS) standard, the multi media card (MMC) standard, the compact flash (CF) standard, the integrated device electronics (IDE) standard, or other suitable standards.

The memory controller 110 is configured to execute a plurality of logic gates or control commands implemented in a form of hardware or firmware. Further, according to the instructions from the host system 1000, the memory controller 110 performs operations such as transmitting commands or data to the smart card chip 140, transmitting data to the host system 1000 after processing the data and conducting data writing, reading, erasing, and merging in the rewritable non-volatile memory module 130.

The rewritable non-volatile memory module 130 is coupled to the memory controller 110 and equipped with a plurality of physical blocks for storing data written by the host system 1000. However, it should be noted that the rewritable non-volatile memory module 130 of the present invention is an optional element rather than an essential element. According to this exemplary embodiment, each of the physical blocks has a plurality of physical pages, and the physical pages belonging to the same physical block can be written individually and erased simultaneously. For instance, in this exemplary embodiment, each of the physical blocks is constituted of 128 physical pages, and a capacity of each of the physical pages is four thousand kilobytes (KB). Nevertheless, it should be understood that the present invention is not limited thereto.

In detail, each of the physical blocks is the smallest unit for erasing data. Namely, each of the physical blocks contains the least number of memory cells that are erased all together. Each of physical pages is the smallest unit for programming data. That is to say, each of the physical pages is the smallest unit for updating data. However, it should be understood that in another exemplary embodiment, the smallest unit for updating data may be one sector or other size. Each physical page usually includes a data bit area and a redundant bit area. The data bit area is used for storing user data, and the redundant bit area is used for storing system data (e.g., error checking and correcting (ECC) codes).

According to the present exemplary embodiment, the rewritable non-volatile memory module 130 is a multi level cell (MLC) NAND flash memory module. However, the present invention is not limited thereto, and the rewritable non-volatile memory module 130 may also be a single level cell (SLC) NAND flash memory module, other flash memory module or other memory module having the same characteristic.

The smart card chip 140 is electrically connected to the memory controller 110 for performing functions such as computation, encryption, bidirectional communication, and security verification. In an embodiment of the present invention, the smart card chip 140 is a contact-type smart card chip compatible with the ISO 7816 standard. Nevertheless, it should be understood that the invention is not limited thereto. For example, the smart card chip 140 may be compatible with ISO 14443, ISO 15408, or other contact-type or non-contact-type smart cards compatible with other smart card ship standards. In another example, the smart card chip 140 may be a radio frequency identification (RFID) chip, a wireless transmission chip (e.g. Bluetooth chip), or a multimedia control chip (e.g. digital recording chip), etc. In addition, it is to be noted that the memory controller 110 and the smart card chip 140 may be two independent chips, or a single chip integrated and packaged together.

Figure 4:
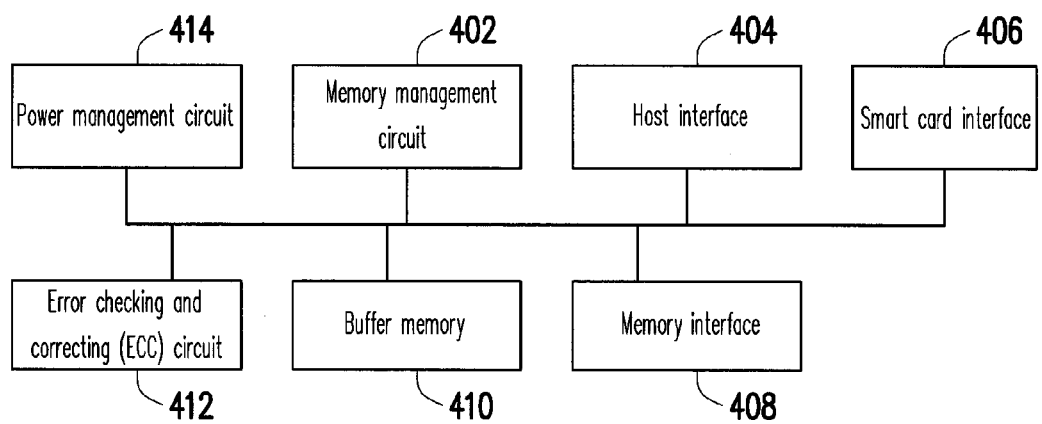
FIG. 4 is a schematic block diagram illustrating a memory controller according to the first exemplary embodiment of the invention.

FIG. 4 is a schematic block diagram illustrating a memory controller according to the first exemplary embodiment of the invention. It should be understood that the memory controller depicted in FIG. 4 is merely exemplary and should not be construed as a limitation to the invention.

With reference to FIG. 4, the memory controller 110 includes a memory management circuit 402, a host interface 404, a smart card interface 406, a memory interface 408, a buffer memory 410, an error checking and correcting (ECC) circuit 412 and a power management circuit 414.

The memory management circuit 402 is configured to control the overall operation of the memory controller 110. Particularly, the memory management circuit 402 has a plurality of control instructions. The control instructions are executed to perform a data writing operation, a data reading operation, a data erasing operation and so on when the memory storage apparatus 100 is operated.

In the present exemplary embodiment, the control commands of the memory management circuit 402 are implemented in a firmware form. For instance, the memory management circuit 402 has a microprocessor unit (not shown) and a read-only memory (ROM, not shown), and the control instructions are burnt into the ROM. When the memory storage apparatus 100 is operated, the control commands are executed by the microprocessor unit to encrypt, transmit, write, read, and erase data.

In another exemplary embodiment of the present invention, the control instructions of the memory management circuit 402 are recorded in a specific area (for instance, the system area of the memory module exclusively used for storing system data) of the rewritable non-volatile memory module 130 as program codes. Additionally, the memory management circuit 402 may have a microprocessor unit (not shown), a read-only memory (not shown) and a random access memory (not shown). In particular, the ROM has boot codes, and when the memory controller 110 is enabled, the microprocessor unit first executes the boot codes to load the control instructions from the rewritable non-volatile memory module 130 into the RAM of the memory management circuit 402. The microprocessor unit then executes the control commands to encrypt, transmit, write, read, and erase data.

Additionally, the control commands of the memory management circuit 402 may also be implemented in a hardware form according to another exemplary embodiment of the present disclosure. For instance, the memory management circuit 402 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is used to manage the physical blocks of the rewritable non-volatile memory module 130. The memory writing unit is used to issue the write command to the rewritable non-volatile memory module 130 to write data to the rewritable non-volatile memory module 130. The memory reading unit is used to issue read command to the rewritable non-volatile memory module 130 to read data from the rewritable non-volatile memory module 130. The memory erasing unit is used to issue erase command to the rewritable non-volatile memory module 130 to erase data in the rewritable non-volatile memory module 130. The data processing unit is used to process the data to be written into the rewritable non-volatile memory module 130, and the data read from the rewritable non-volatile memory module 130.

The host interface 404 is coupled to the memory management circuit 402 and the host system 1000, and is configured to receive and identifying commands and data transmitted by the host system 1000 and transmitting the response data stream to the host system 1000. In the present exemplary embodiment, the host interface 404 complies with the SD standard. However, the invention is not limited thereto, and the host interface 404 can also comply with the PATA standard, the IEEE 1394 standard, the PCI Express standard, the USB standard, the SD standard, the MS standard, the MMC standard, the CF standard, the IDE standard, or any other appropriate data transmission standard.

The smart card interface 406 is coupled to the memory management circuit 402 and the smart card chip 140, and is used to transmit the commands or data outputted by the memory management circuit 402 to the smart card chip 140, and is further used to transmit the response message generated by the smart card chip 140 to the memory management circuit 402.

The memory interface 408 is coupled to the memory management circuit 402 and configured to access the rewritable non-volatile memory module 130. Namely, data to be written into the rewritable non-volatile memory module 130 is converted by the memory interface 408 into a format acceptable to the rewritable non-volatile memory module 130.

The buffer memory 410 is coupled to the memory management circuit 402 and configured to temporarily store data and commands received from the host system 1000 or data received from the rewritable non-volatile memory module 130. The buffer memory may be a static random access memory (SRAM), a dynamic random access memory (DRAM), a magnetoresistive random access memory (MRAM), a phase change random access memory (PRAM), a synchronous DRAM (SDRAM), or other suitable memories.

The error checking and correcting circuit 412 is coupled to the memory management circuit 402 and configured to execute an error correcting procedure to ensure data accuracy. Specifically, when the host interface 404 receives a write command from the host system 1000, the ECC circuit 212 generates an error checking and correcting (ECC) code for the data corresponding to the write command, and the memory management circuit 402 writes the data and the corresponding ECC code into the rewritable non-volatile memory module 130. Subsequently, when the memory management circuit 402 reads the data from the rewritable non-volatile memory module 130, the memory management circuit 402 simultaneously reads the ECC code corresponding to such data, and the ECC circuit 412 executes the error correcting procedure for the read data based on the ECC code.

The power management circuit 414 is coupled to the memory management circuit 402 and configured to control the power of the memory storage apparatus 100.

Figure 5:
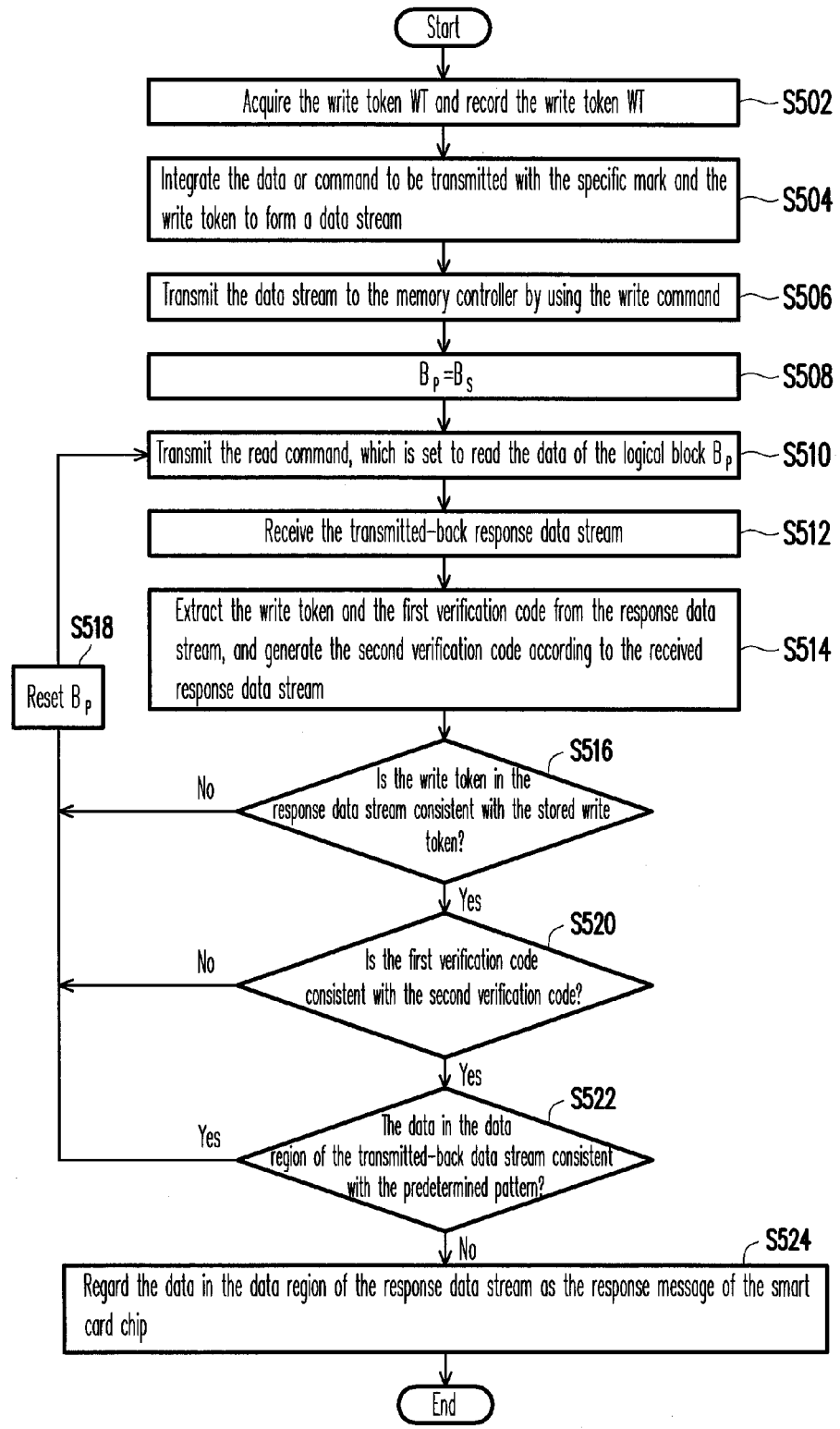
FIGS. 5 and 6 are flow charts respectively illustrating the operation of the host system and the memory storage apparatus according to the first exemplary embodiment of the invention.
Figure 6:
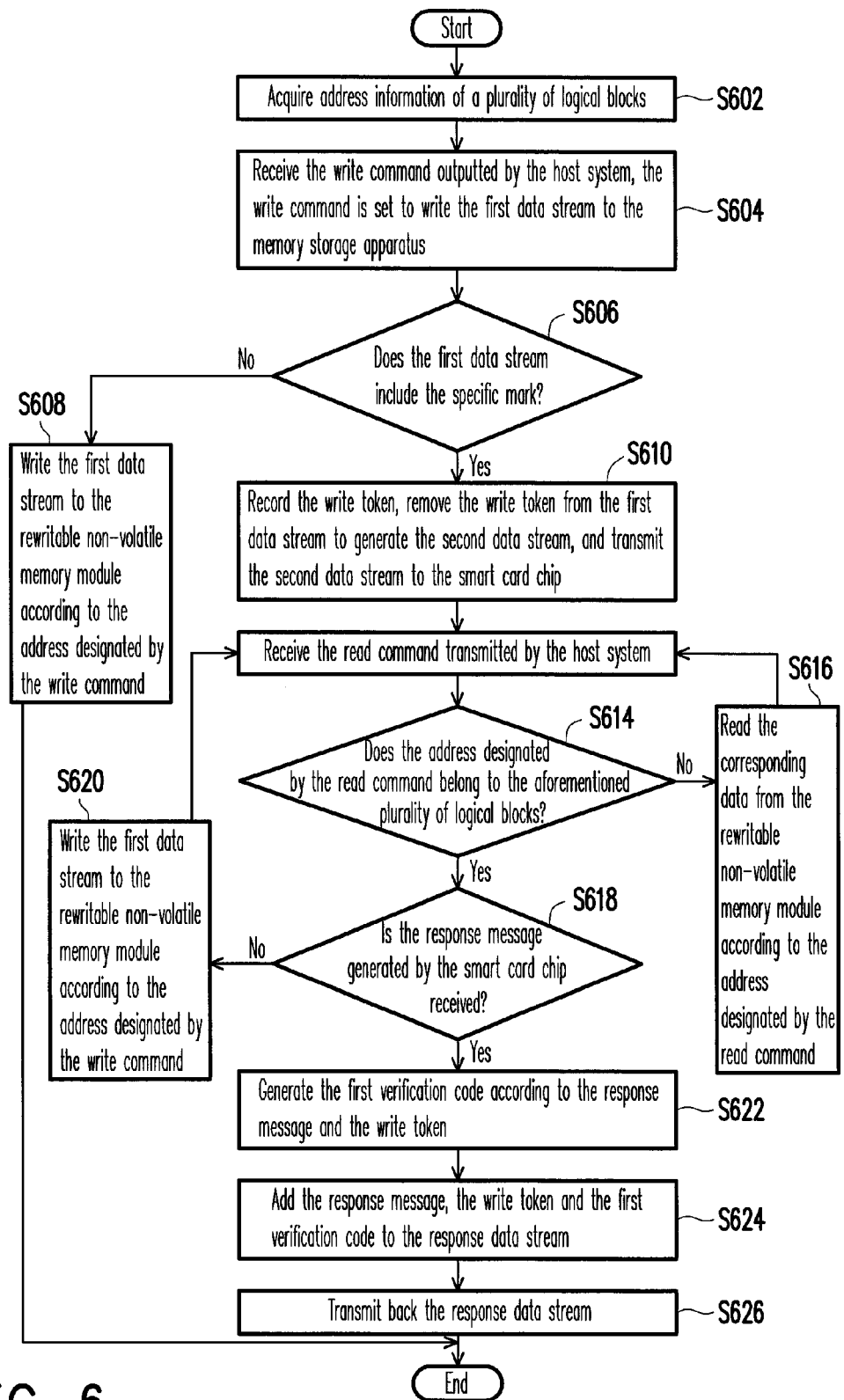

In an embodiment of the present invention, when the host system 1000 performs operations to the aforementioned memory storage apparatus 100 with the smart card chip 140, the memory controller 110 in association with the data processing module 206 of the host system 1000 can accurately transmit data or commands to the smart card chip 140 and accurately transmit response messages from the smart card chip 140 to the host system 1000. In the following, the flow chart of the data transmitting procedure executed between the memory controller 110 and the host system 1000 accompanied with FIG. 5 and FIG. 6 is illustrated in further detail. FIG. 5 is a flow chart illustrating the operation of the host system 1000 according to the first exemplary embodiment of the invention. FIG. 6 is a flow chart illustrating the operation of the memory storage apparatus 100 according to the first exemplary embodiment of the invention.

Referring to FIG. 5, before transmitting data to the smart card chip 140, the host 1000 acquires or generates a write token WT, and records the write token WT (step S502). The write token WT can be generated according to a predetermined principle, for instance, the write token WT may be generated sequentially, randomly, or according to a system time. Thus, generally, every time the host system 1000 transmits data to the smart card chip 140, the write tokens WT acquired by the host system 1000 are usually different. In addition, when the host system 1000 transmits the write command to the smart card chip 140, the write token WT is transmitted to the memory controller 110 with the write command. Moreover, the write token WT is also included in the data stream transmitted back to the host system 1000. The data processing module 206 of the host system 1000 then compares whether the recorded write token is consistent with the write token transmitted back from the memory controller 110 to serve as a basis for verifying the correctness of the response data stream. In another exemplary embodiment, after the host system 1000 generates the write token WT, the write token is edited again and is then transmitted to the memory controller 110 with the write command. Therefore, when the host system 1000 transmits the write command to the memory controller 110, the edited write token is transmitted to the memory controller 110 with the write command and is also included in the response data stream transmitted from the memory controller 110 back to the host system 1000.

Figure 7:
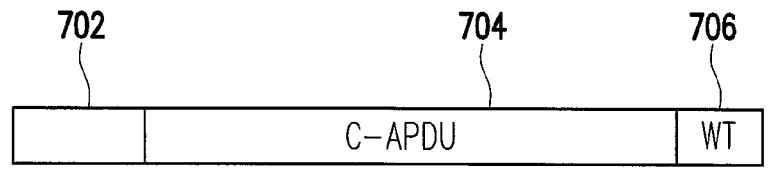
FIG. 7 illustrates the structure of the data stream applied when the host system transmits commands or data to the smart card chip through the memory controller in one embodiment of the present invention.

Thereafter, before the host system 1000 transmits data or commands to the smart card chip 140 of the memory storage apparatus 100, the host system 1000 combines data or the commands to be transmitted with a specific mark and the write token WT to form the data stream (step S504). The aforementioned specific mark is used by the memory controller 110 as a basis to determine whether at least a portion of the data or commands transmitted by the host system 1000 should be transmitted to the smart card chip 140. If any of the data stream received by the memory controller 110 from the host system 1000 comprises the specific mark, the memory controller 110 transmits at least a portion of the data stream having the specific mark to the smart card chip 140. Referring to FIG. 7, in the present embodiment, the data or command 704 transmitted by the host system 1000 to the memory controller 110 is a command-application protocol data unit (C-APDU). Moreover, after the C-APDU 704 combines with the specific mark 702 and a write token 706, a data stream 700 is formed for the communication between the host system 1000 and the smart card chip 140. However, it should be noted that in other embodiments of the present invention with the memory storage apparatus 100 not having the rewritable non-volatile memory module 130, the data stream 700 may not include the specific mark 702. That is, to the embodiments not having the rewritable the non-volatile memory module 130, the specific mark 702 does not need to be included in the data stream 700. In other words, in the aforementioned embodiments not having the rewritable non-volatile memory module 130, when performing step S504, the data stream 700 can be formed by merely combining the C-APDU 704 and the write token 706. In the present embodiment, the specific mark 702 is located in the most significant bit (MSB) in the data stream 700 and is formed before the C-APDU 704. The write token 706 is located in the least significant bit (LSB) in the data stream 700 and is formed after the C-APDU 704. However, it should be noted that the location of the specific mark 702 and the write token 706 are not limited thereto. For instance, in another embodiment of the present invention, the bits of the specific mark 702 and the write token 706 are distributed in the data stream 700 through an encoder. Afterwards, the specific mark 702 and the write token 706 are extracted from the data stream 700 through the decoder corresponding to the encoder. In addition, in one embodiment of the present invention, the specific mark 702 and the write token 706 are located on the same end of the data stream 700. In another embodiment of the present invention, the specific mark 702 is located on the right end of the data stream 700 and the write token 706 is located on the left end of the data stream 700. Furthermore, in another exemplary embodiment, the specific mark 702 is generated by the memory controller 110 according to addresses of the data or commands to be transmitted. In another exemplary embodiment, the host system 1000 combines the data or commands to be transmitted with the write token WT to form the data stream 700 and then transmits the data stream 700 to the memory controller 110. If the transmitted commands (e.g. read commands or write commands) contain a data read address or a data write address, the memory controller 110, after receiving the commands from the host system 1000, performs the relevant operations (e.g. read or write) to the corresponding address according to the address in the command. In addition, because the smart card chip 140 and the rewritable non-volatile memory module 130 have different address segments, in an embodiment of the present invention, without generating the specific mark, the memory controller 110, according to the corresponding address of the command, can determine whether the command is used to control the operation of the rewritable non-volatile memory module 130, or used to instruct the memory controller 110 to transmit at least a portion of the data stream transmitted by the host system 1000 to the smart card chip 140.

Also, it should be understood that in the present embodiment, if the host system 1000 is accessing the rewritable non-volatile memory module 130 instead of the smart card chip 140, the aforementioned specific mark 702 and the write token 706 are not to be integrated into the data stream transmitted from the host system 1000 to the memory controller 110. The following description illustrates how the memory controller 110 determines whether the destination for the data stream transmission is the rewritable non-volatile memory module 130 or the smart card chip 140 by determining whether the specific mark is included in the received data stream.

After the data stream 700 has been formed, the host system 1000 transmits the data stream 700 to the memory controller 110 of the memory storage apparatus 100 through the write command (step S506). That is, the host system 1000 transmits the write command to the memory storage apparatus 100, and thus such write command is set to write the data stream 700 into the memory storage apparatus 100.

Figure 8:
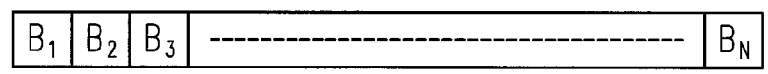
FIG. 8 is a schematic view of the plurality of logical blocks.

After the data stream 700 is transmitted to the memory controller 110, the host system 1000 sequentially transmits a plurality of read commands to the memory controller 110 of the memory storage apparatus 100 until the host system 1000 receives the response message generated by the smart card chip 140 from the memory storage apparatus 100. Each of the read commands is set to read data of a logical block in a plurality of logical blocks $B_1$ to $B_N$ of the memory storage apparatus 100. FIG. 8 is a schematic view of the aforementioned plurality of logical blocks $B_1$ to $B_N$. In the present invention, the plurality of logical blocks $B_1$ to $B_N$ may belong to a single specific file or multiple specific files. In one embodiment of the present invention, each logical block of the plurality of logical blocks $B_1$ to $B_N$ has the same capacity.

Referring to FIG. 5, before transmitting the plurality of read commands to the memory storage apparatus 100, the data processing module 206 of the host system 1000 sets an indicator $B_P$ to correspond $B_P$ to one logical block $B_S$ of the plurality of logical blocks $B_1$ to $B_N$ (step S508). The logical block $B_S$ is defined as a "start logical block" to represent the first logical block corresponding to the first executed read command. It should be noted that the start logical block $B_S$ may be any block in the plurality of logical blocks $B_1$ to $B_N$. When the indicator $B_P$ is set as the start logical block $B_S$, the host system 1000 transmits a read command (step S510) and such read command is set to read data from the logical block corresponding to the read indicator $B_P$. It should also be noted that before the host system 1000 transmits the read command, the data processing module 206 first determines whether the cache memory 212 has already recorded the data of the logical block corresponding to the indicator $B_P$. If affirmative, the data processing module 206 directly reads from the cache memory 212 and does not read from the memory storage apparatus 100. On the other hand, if the cache memory 212 does not record the data of the logical block corresponding to the indicator $B_P$, the read command in the step S510 is transmitted to the memory controller 110 of the memory storage apparatus 100 and is executed by the memory controller 110. In the present embodiment, after receiving the read command outputted by the host system 1000, the memory controller 110 first determines whether the read command is set to read the data in the aforementioned plurality of logical blocks $B_1$ to $B_N$. If the read command is set to read the data recorded in the aforementioned plurality of logical blocks $B_1$ to $B_N$, the memory controller 110 directly generates data with a predetermined pattern (e.g. all bytes thereof are zero) from a register to reduce the time consumed for reading the data. The aforementioned predetermined pattern may be data of any type, so the host system 1000 may determine whether the received response data stream is the response data stream generated by the memory controller 100 due to the smart card chip's 140 not yet generating the response message. The host system can achieve such determination by determining whether the response data stream transmitted back from the memory controller 100 is the aforementioned predetermined pattern. In other words, if response data stream received by the host system 1000 is the predetermined pattern of data, the host system 1000 determines that the received response data stream is the response data stream generated by the memory controller 100 due to the smart card chip's 140 not yet generating the response message.

Referring again to FIG. 5, the host system 1000, through the data processing module 206, obtains the response data stream corresponding to the address-to-read from the memory storage apparatus 100 or the cache memory 212 (step S512). The feedback data stream includes the write token WT and the first verification code. Specifically, the memory controller 110 generates the aforementioned first verification code after encoding relevant information. The relevant information may be the response message of the smart card chip 140, the write token WT or the data read from the rewritable non-volatile memory module 130. For example, in an embodiment of the present invention, the memory management circuit 402 of the memory controller 110 executes a hash function, using the response message generated by the smart card chip 140 and the write token WT, to generate the first verification code. In another exemplary embodiment of the present invention, the memory management circuit 402 of the memory controller 110 executes a hash function, using the response message generated by the smart card chip 140, the specific mark 702, and the write token WT, to generate the first verification code. In addition, when the memory controller 110 receives the data stream 700 having the write token WT, the memory controller 110 records the write token WT therein. Afterwards, when the memory controller 110 responds to the read command transmitted by the host system 1000, the recorded write token WT is then added to the response data stream.

Figure 9:
FIG. 9 illustrates the structure of the response data stream transmitted from the memory controller back to the host system in one embodiment of the present invention.

Referring to FIG. 9, FIG. 9 is a data structural diagram of a response data stream 900 transmitted from the memory controller 110 back to the data processing module 206. The response data stream 900 includes a write token region 902, a data region 904 and a verification data region 906. The token region 902 is used to record the aforementioned write token WT. The data region 904 is used to record the message generated by the smart card chip 140 or record the data of the aforementioned predetermined pattern. The verification data region 906 is used to record the aforementioned first verification code. It is to be noted that the positions of the write token region 902, the data region 904 and the verification data region 906 in the response data stream 900 is not limited to FIG. 9 thereto, and can be adjusted according to different needs.

With reference to FIG. 5, after receiving the response data stream 900 in step S512, the data processing module 206 of the host system 1000 extracts the write token WT and the first verification code from the response data stream 900, and generates the second verification code according to the received response data stream 900 (step S514). The write token WT and the first verification code extracted from the response data stream 900 may be edited or unedited. In addition, the method for the host system 1000 to generate the second verification code may be the same as the method for the memory controller 110 to generate the first verification code. For example, the host system 1000 and the memory controller 110 may execute a same hash function to generate the second verification code and the first verification code, respectively. In an embodiment of the present invention, the host system 1000 uses the extracted response message and the extracted write token WT to execute the hash function to generate the aforementioned second verification code. In an embodiment of the present invention, the host system 1000 uses the extracted response message, the extracted specific mark 702 and the extracted write token WT to execute the hash function to generate the aforementioned second verification code. Afterwards, in step S514, the host system 1000 uses the data processing module 206 to determine whether the write token WT in the response data stream 900 is consistent with the write token WT recorded by the host system 1000 (step S516). If the two write tokens WT are consistent with each other, perform step S520. If the two write tokens WT are inconsistent, perform step S518.

In step S518, the data processing module 206 of the host system 1000 resets the indicator $B_P$ to repeat steps S510-S516.

In step S520, the host system 1000 uses the data processing module 206 to determine whether the first verification code is consistent with the second verification code generated by the host system 1000. If the first verification code is consistent with the second verification code, perform step S522. If the first verification code is inconsistent with the second verification code, perform step S518.

Generally, the usual result of the determination in step S516 is that the write token WT in the response data stream 900 is consistent with the write token WT recorded by the host system 1000; and the usual result of the determination in step S520 is that the first verification code is consistent with the second verification code. However, because the host system is equipped with the cache memory 212, the cache memory 212 will store the response data stream previously transmitted back from the memory controller 110. When the data processing module 206 is reactivated, the write token WT recorded by the host system 1000 may be consistent with the write token WT in the response data stream 900. Thus, the data of the response data stream 900 received by the host system 1000 may be the old data recorded by the cache memory 212, instead of completely the new data generated by the memory storage apparatus 100. In addition, because the cache memory 212 handles cache data differently, when the host system 1000 reads the data on the logical blocks $B_1$-$B_N$, the cache memory 212 may transmit back the old data to the data processing module 206. This may also render the data of the response data stream 900 received by the host system 1000 to be the old data recorded by the cache memory 212, instead of completely the new data generated by the memory storage apparatus 100. Therefore, if the write token WT in the response data stream 900 is inconsistent with the write token WT recorded by the host system 1000 or the first verification code is inconsistent with the second verification code, the response data stream 900 is determined to be old data temporarily recorded in the cache memory 212 rather than a new response data stream generated by the memory controller 110 in response to the current read command.

In step S522, the host system 1000 uses the data processing module 206 to determine whether data in the data region 904 of the response data stream 900 is consistent with the above-mentioned predetermined pattern. If the data in the data region 904 of the response data stream 900 is consistent with the aforementioned predetermined pattern, it means that the memory controller 110 has not yet received a response message from the smart card chip 140 and then step S518 is performed. In contrast, if the data in the data region 904 of the response data stream 900 is inconsistent with the aforementioned predetermined pattern, it means that the memory controller 110 has received a response message from the smart card chip 140 and then step S524 is performed and the data in the data region 904 of the response data stream 900 is regarded as the response message generated by the smart card chip 140.

Corresponding to the procedure of the operation of the host system 1000 and the smart card chip 140 illustrated in FIG. 5, the procedure of the operation of the memory storage apparatus 100 and the host system 1000 is illustrated in FIG. 6. First, when the memory storage apparatus 100 starts to operate, the memory controller 110 obtains the address information of the plurality of logical blocks $B_1$ to $B_N$ (step S602) for comparing read commands transmitted by the host system 1000. Then, the controller 110 starts to receive the write command outputted by the host system 1000 (step S604). The write command is set to write a first data stream into the memory storage apparatus 100 and the first data stream can be the data stream 700 in FIG. 7 or other data streams. After receiving the write command, the memory controller 110 determines whether the first data stream includes the specific mark 702 as illustrated in FIG. 7 (step S606). If the first data stream does not include the specific mark 702, the memory controller 110 writes the first data stream into the rewritable non-volatile memory module 130 according to the address designated by the write command (step S608). On the contrary, if the first data stream includes the specific mark 702, the memory controller 110 records the write token WT (such as the write token 706 in FIG. 7) in the first data stream in the buffer memory 410. Also, the specific mark 702 and the write token WT are removed from the first data stream to produce a second data stream (such as the C-APDU 704 illustrated in FIG. 7). The second data stream is then transmitted to the smart card chip 140 (step S610). Accordingly, by determining whether the first data stream includes the specific mark 702, the memory controller 110 can determine if the data stream is to be transmitted to the rewritable non-volatile memory module 130 or the smart card chip 140. It should be noted that in another embodiment not having the rewritable non-volatile memory module 130 in the present invention, because the data stream 700 does not include the specific mark 702, steps S606 and S610 in the flow chart of FIG. 4 are omitted. Moreover, the specific mark 702 does not need to be removed from the data stream 700 in step S610. Instead, at least a portion of the data stream 700 is directly transmitted to the smart card chip 140. It should be noted that in another embodiment of the present invention, the second data stream is the first data stream. In other words, the memory controller 110 does not remove the specific mark 702 or the write token WT from the first data stream. Instead, the first data stream is directly transmitted to the smart card chip 140 by the memory controller 110. Afterwards, the smart card chip 140 identifies the specific mark 702, the C-APDU 704, and the write token WT from the received first data stream. In addition, in the present embodiment, the write token WT in the first data stream is not only recorded in the buffer memory 410 as described above. In another embodiment of the present invention, the memory controller 110 also records the write token WT in the first data stream into the rewritable non-volatile memory module 130.

After the second data stream is transmitted to the smart card chip 140, the memory controller 110 then waits for receiving the read command transmitted from the host system 1000 (step S612). The read command includes, but is not limited to the read command transmitted by the host system 1000 in step S510 of FIG. 5. Subsequently, the memory controller 110 determines whether the address designated by the received read command belongs to the plurality of logical blocks $B_1$ to $B_N$ (step S614). That is, the memory controller 110 determines whether the received read command is set to read the data recorded in the plurality of logical blocks $B_1$ to $B_N$. If the address designated by the read command does not belong to the plurality of logical blocks $B_1$ to $B_N$, the memory controller reads the corresponding data according to the address designated by the read command (step S616) and transmits the data to the host system 1000. On the contrary, if the address designated by the read command belongs to the plurality of logical blocks $B_1$ to $B_N$, the memory controller 110 determines again whether the response message from the smart card chip 140 has been received (step S618). In the present embodiment, the response message is generated by the smart card chip 140 in response to receiving the second data stream and the response is a response-application protocol data unit (R-APDU). In step S618, if the memory controller 110 has received the response message of the smart card chip 140, the memory controller generates the first verification code according to the response message and the write token WT (step S622). Afterwards, the memory controller 110 adds the response message, the write token WT and the first verification code to the response data stream 900 (step S624), and then transmits the response data stream 900 to the host system 1000 (step S626).

In step S618, if the memory controller 110 has not received the response message of the smart card chip 140, the memory controller 110 transmits back the second response data stream to the host system 1000 to respond to the received read command (step S620). In the present embodiment, the data structure of the second response data stream is also the same as the data structure of the response data stream 900 illustrated in FIG. 9. Herein, the write token region 902 is used to record the write token WT, and the data in the data region 904 is a predetermined pattern. In another embodiment of the present invention, according to the write token WT and the aforementioned predetermined pattern, the memory controller 110 generates another first verification code and adds the first verification code to the verification data region 906 of the second response data stream. Accordingly, the host system can verify the correctness of the second response data stream according to the first verification code of the second response data stream. In another embodiment of the present invention, memory controller 110 does not generate another first verification code if the response message of the smart card chip 140 is not received yet in step S618. Instead, the memory controller 110 respectively adds the aforementioned write token WT and the predetermined pattern to the write token region 902 and the data region 904 of the response data stream 900 to generate the second response data stream.

After step S620 has been performed, the memory controller 110 then waits for the next read command of the host system 1000 until the response message generated by the smart card chip 140 is received, and the response data stream 900 having the response message of the smart card chip 140 is transmitted back to the host system 1000.

Figure 10:
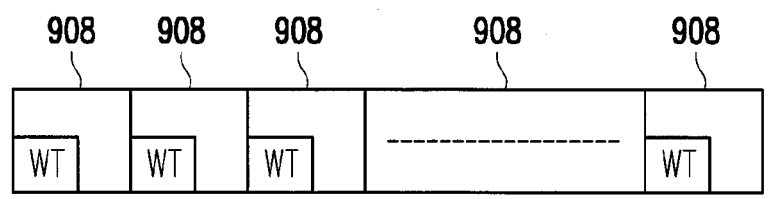
FIG. 10 illustrates the structure of the response data stream transmitted from the memory controller back to the host system in another embodiment of the present invention.

In some of the aforementioned embodiments, the response data stream 900 includes the write token region 902, the data region 904 and the verification data region 906. The write token region 902 is used to store the write token WT. However, in an embodiment of the present invention, the response data stream 900 may have a plurality of data segments, and the memory controller 110 adds the write token WT to each of the data segments. Referring to FIG. 10, in this embodiment, the response data stream 900 has a plurality of data segments 908, and each data segment 908 includes the write token WT integrally. More specifically, in this embodiment, when the memory controller 110 transmits the response data stream 900 back to the host system 1000, the memory controller 110 will add the write token WT to each data segment 908, so that each data segment 908 records write token WT integrally. Afterwards, the host system 1000 respectively extracts the write token WT from each of the data segments 908 of the response data stream 900, and determines whether each of the extracted write token is consistent with the recorded write token WT. If each of the extracted write token WT is consistent with the recorded write token WT, the response data stream 900 is determined to be the new data generated by the memory storage apparatus 100, instead of the old data recorded by the cache memory 212.

In an exemplary embodiment of the present invention, the size of each data segment 908 is the size of a sector (512 Bytes). Each of the sectors is the smallest unit for updating data for the host system 1000. However, the present invention is not limited thereto. The size of each data segment 908 may be other sizes, such as 1 KB, 2 KB and so on.

Figure 11:
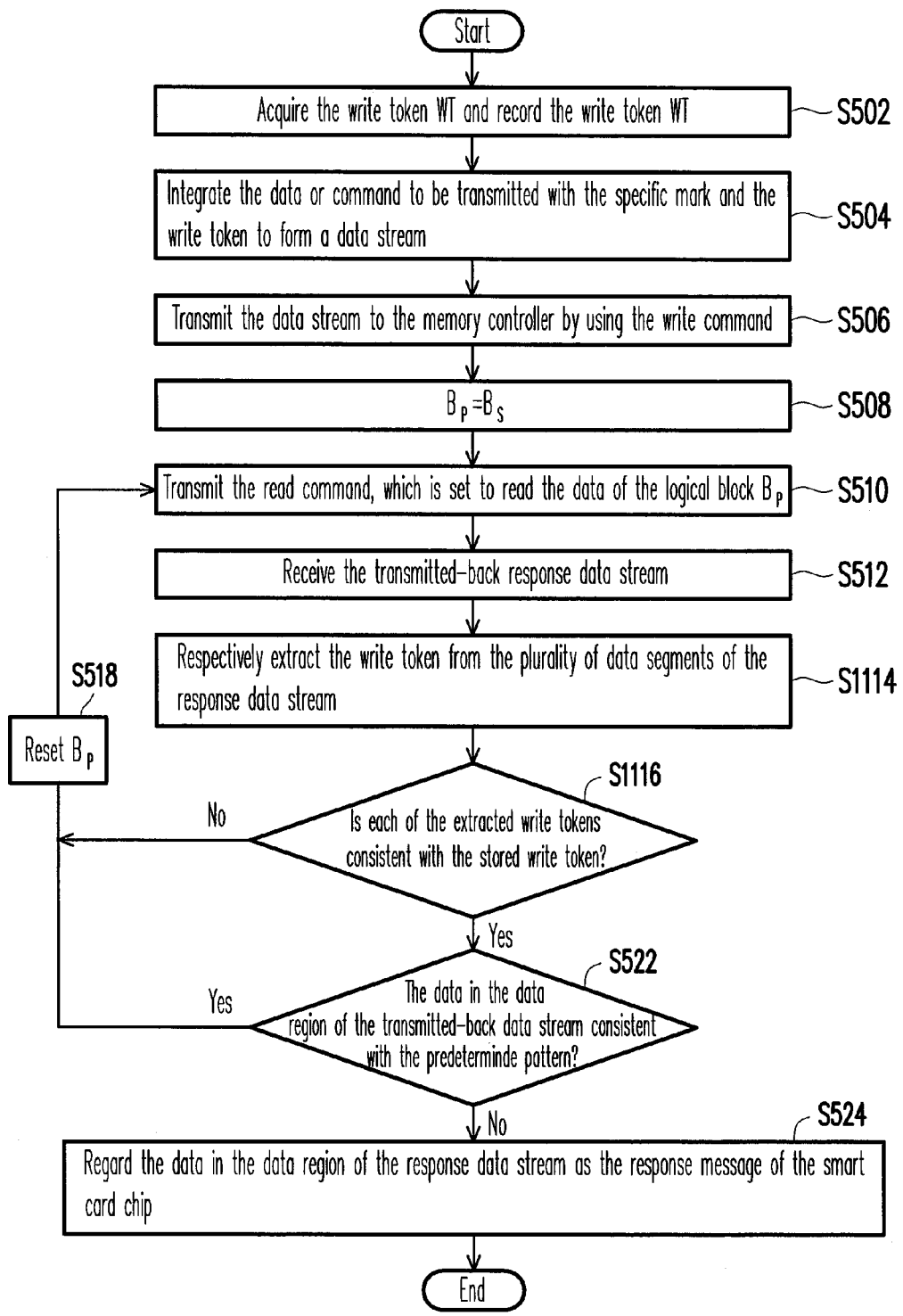
FIGS. 11 and 12 are flow charts respectively illustrating the operation of the host system 1000 and the memory storage apparatus according to the first exemplary embodiment of the invention.
Figure 12:
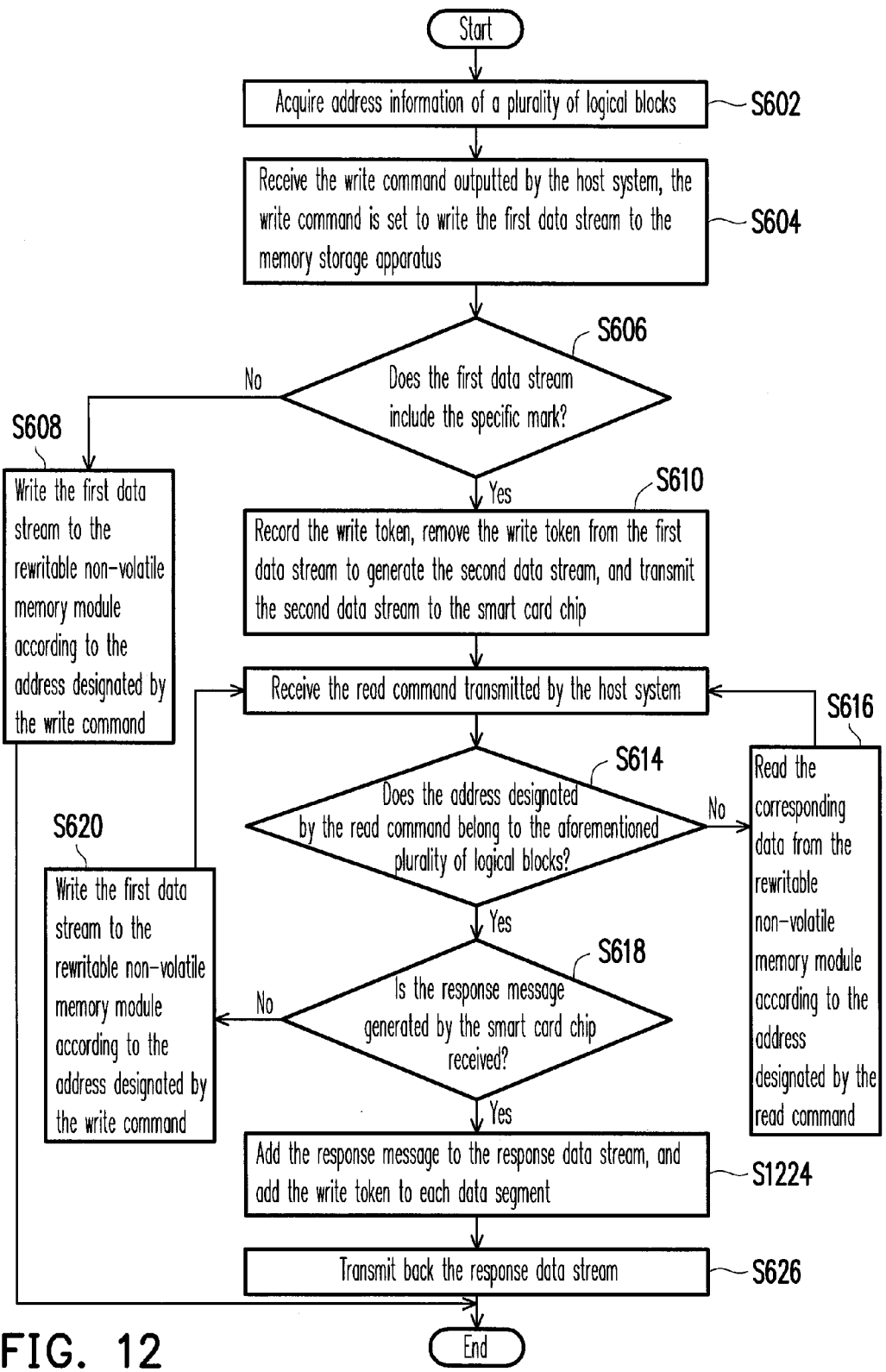

With reference to FIGS. 11 and 12, FIGS. 11 and 12 are flow charts respectively illustrating the operation of the host system 1000 and the memory storage apparatus 100 according to the first exemplary embodiment of the invention. The flow of operations of FIG. 11 is generally similar to the flow of operations of FIG. 5. Still, there are two differences. First, step S1114 in FIG. 11 replaces step S514 in FIG. 5. Second, step S1116 in FIG. 11 replaces steps S516 and S520 in FIG. 5. The host system 1000 extracts the write token WT from each of the data segments 908 in step S1114, and determines whether each of the extracted write token is consistent with the recorded write token WT in step S1116. If any of the extracted write token WT is inconsistent with the write token WT recorded by the host system 1000, perform step S518. In addition, the flow of operations of FIG. 12 is generally similar to the flow of operations of FIG. 6. Still, there is one difference. Step S1224 in FIG. 12 replaces steps S622 and S624 in FIG. 6. In step S1224, the memory controller 110 adds the response message generated by the smart card chip 140 to the response data stream 900, and writes the write token WT to each data segment 908 of the response data stream 900.

In an exemplary embodiment of the present invention, in addition to writing the write token WT to each data segment 908 of the response data stream 900, the memory controller 110 generates the aforementioned first verification code. Further, in addition to determining whether each extracted write token WT is consistent with the recorded write token WT, the host system 1000 generates the second verification code according to the received response data stream 900, and determines whether the second verification code is consistent with the first verification code.

Figure 13:
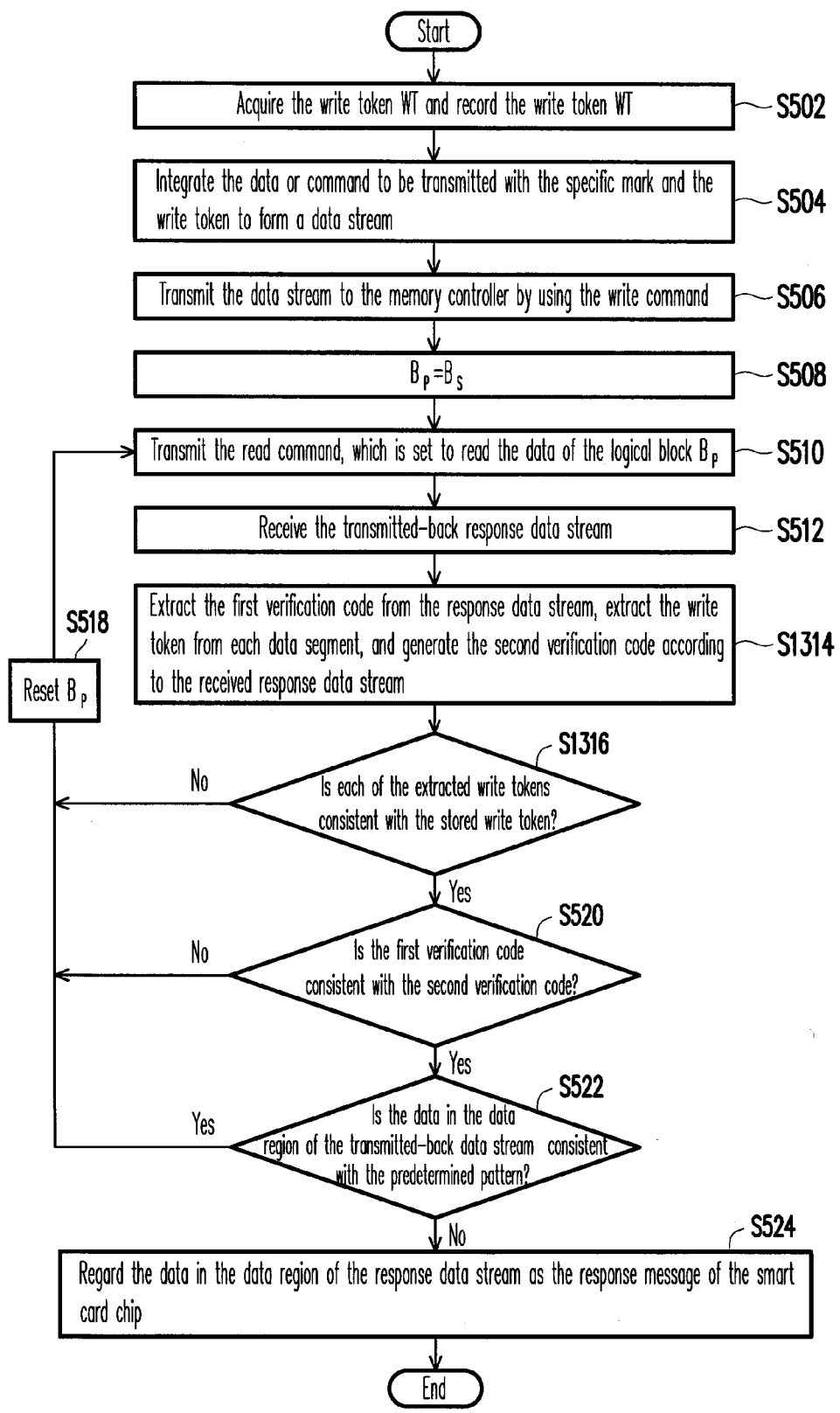
FIGS. 13 and 14 are flow charts respectively illustrating the operation of the host system and the memory storage apparatus according to the first exemplary embodiment of the invention.
Figure 14:
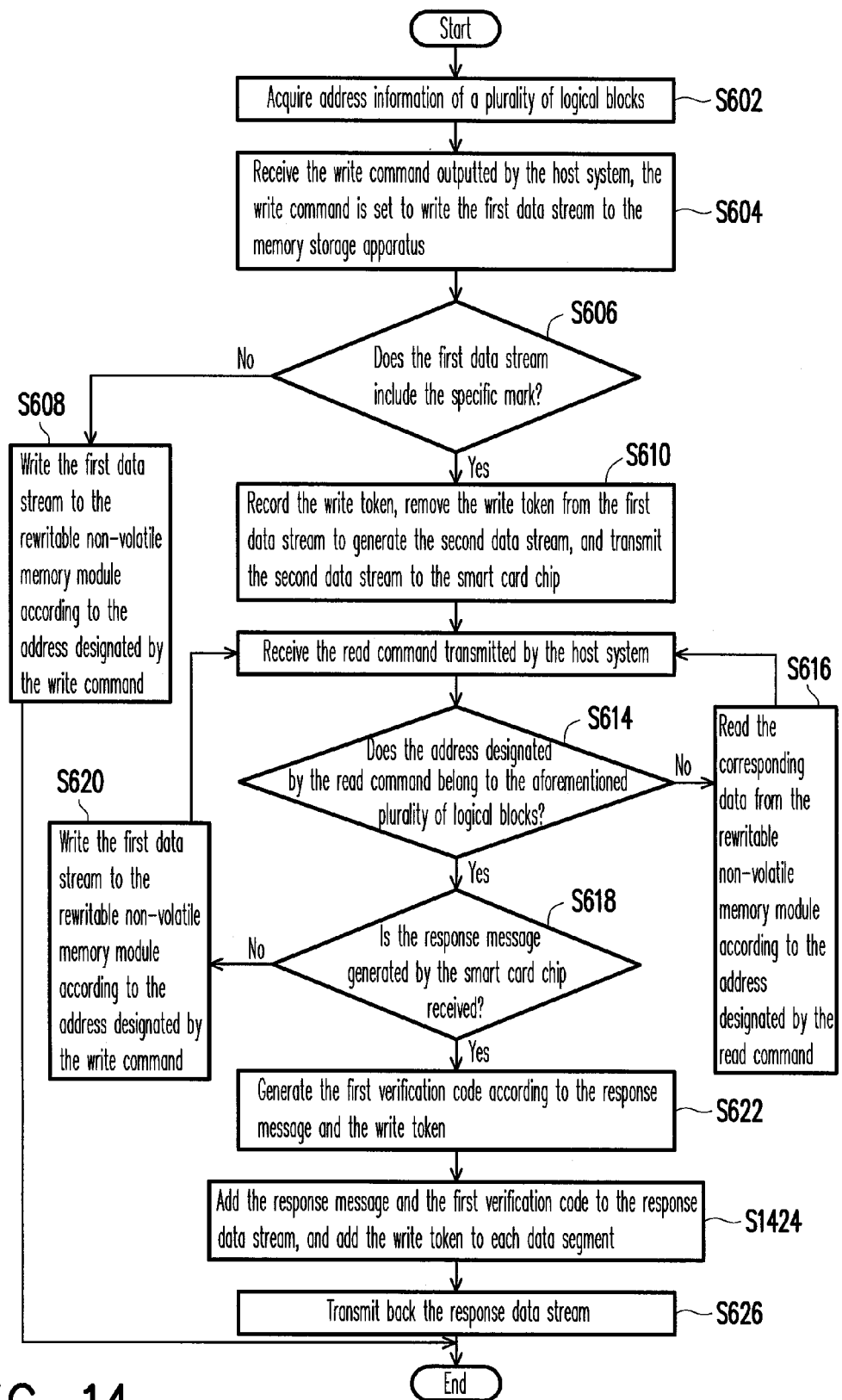

With reference to FIGS. 13 and 14, FIGS. 13 and 14 are flow charts respectively illustrating the operation of the host system 1000 and the memory storage apparatus 100 according to the first exemplary embodiment of the invention. The flow of operations of FIG. 13 is generally similar to the flow of operations of FIG. 5. Still, there are two differences. First, step S1314 in FIG. 13 replaces step S514 in FIG. 5. Second, step S1316 in FIG. 13 replaces steps S516 and S520 in FIG. 5. In step S1314, the host system 1000 extracts the first verification code from the response data stream 900, and respectively extracts write token WT from each data segment 908, and generates the second verification code according to the received response data stream. In step S1316, the host system 1000 determines whether each extracted write token WT is consistent with the recorded write token WT. If any of the extracted write token WT is inconsistent with the write token WT recorded by the host system 1000, perform step S518. In addition, the flow of operations of FIG. 14 is generally similar to the flow of operations of FIG. 6. Still, there is one difference. Step S1424 in FIG. 12 replaces step S624 in FIG. 6. In step S1424, the memory controller 110 adds the response message generated by the smart card chip 140 to the response data stream 900, and writes the write token WT to each data segment 908 of the response data stream 900.

Based on the above, an embodiment of the present invention provides a method, a memory storage apparatus and a memory controller for transmitting and identifying data streams, suitable for data transmission between the host system and the memory storage apparatus. The memory controller passes at least a portion of the data stream transmitted by the host system to the smart card chip of the memory storage apparatus. Afterwards, the host system receives a response message generated by the smart card chip accurately by executing a plurality of read commands. The memory controller can transmit the first verification code back to the host system. The memory controller also can respectively record the write token to each of the data segment of the response data stream. The host system generates the second verification code according to the received response data stream. The host system confirms the correctness of the response data stream by determining whether the first verification code is consistent with the second verification code. In addition, the host system also confirms the correctness of the response data stream by determining the write token of each data segment. Accordingly, the host system receives a response message generated by the smart card chip accurately. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting and identifying data streams, configured to transmit data between a host system and a memory storage apparatus, the memory storage apparatus having a smart card chip, the method comprising:
   (a) the host system generating and storing a write token, and embedding the write token in a data stream;
   (b) the host system transmitting a write command to the memory storage apparatus, the write command being set to write the data stream to the memory storage apparatus;
   (c) the memory storage apparatus transmitting at least a portion of the data stream to the smart card chip, and recording the write token of the data stream;
   (d) the host system sequentially transmitting a plurality of read commands to the memory storage apparatus until the host system receives a response data stream from the memory storage apparatus, wherein the response data stream is divided into a plurality of data segments and is transmitted to the host system in response to one of the read commands, wherein the write token is recorded in each of the data segment and a response message and a first verification code are added into the response data stream, the response message is generated by the smart card chip in response to receiving at least a portion of the data stream, and the memory storage apparatus generates the first verification code according to the response message and the write token;

(e) the host system extracting the write tokens, the response message and the first verification code from the data segments of the response data stream, and generating a second verification code according to the extracted write token and the extracted response message; and (f) the host system determining whether the extracted first verification code is consistent with the second verification code, and determining whether each of the extracted write tokens is consistent with the recorded write token, and if the first verification code is consistent with the second verification code and each of the extracted write tokens is consistent with the recorded write token, the host system regards the response message in the received response data stream as the response message generated by the smart card chip.

2. The method for transmitting and identifying data streams according to claim 1, wherein the memory storage apparatus uses the response message and the write token to execute a hash function to generate the first verification code, and the host system uses the extracted write token and the extracted response message to execute the hash function to generate the second verification code.

3. The method for transmitting and identifying data streams according to claim 1, wherein in step (f), if it is determined that the extracted first verification code is inconsistent with the second verification code or the extracted write token is inconsistent with the recorded write token, steps (d), (e) and (f) are repeated.

4. The method for transmitting and identifying data streams according to claim 1, wherein if the host system determines in step (f) that any of the extracted write tokens is inconsistent with the recorded write token, steps (d), (e) and (f) are repeated.

5. The method for transmitting and identifying data streams according to claim 1, wherein the size of each of the data segments is the size of a sector.

6. The method for transmitting and identifying data streams according to claim 1, further comprising:
the memory storage apparatus determining whether any of the data streams received by the host system comprises a specific mark; and
transmitting at least a portion of the data stream comprising the specific mark to the smart card chip when any of the data streams received by the host system comprises the specific mark.

7. The method for transmitting and identifying data streams according to claim 6, wherein the response data stream further comprises the specific mark, the memory storage apparatus uses the specific mark, the response message and the write token to execute a hash function to generate the first verification code, wherein the host system further extracts the specific mark from the received response data stream, and uses the extracted specific mark, the extracted write token and the extracted response message to execute the hash function to generate the second verification code.

8. A method for transmitting and identifying data streams, configured to transmit data between a host system and a memory storage apparatus, the memory storage apparatus having a smart card chip, the method for transmitting and identifying data streams comprising:

(a) the host system generating and storing a write token, and embedding the write token in the data stream;

(b) the host system transmitting a write command to the memory storage apparatus, the write command being set to write the data stream to the memory storage apparatus;

(c) the memory storage apparatus transmitting at least a portion of the data stream to the smart card chip, and recording the write token of the data stream;

(d) the host system sequentially transmitting a plurality of read commands to the memory storage apparatus until the host system receives a response data stream from the memory storage apparatus, wherein the response data stream is divided into a plurality of data segments and is transmitted to the host system in response to one of the read commands, wherein the write token is recorded in each of the data segments and a response message is added into the response data stream, wherein the response message is generated by the smart card chip in response to receiving at least a portion of the data stream;

(e) the host system extracting the write token from each of the data segments of the received response data stream; and (f) the host system determining whether each of the extracted write token is consistent with the recorded write token, wherein when each of the extracted write token is consistent with the recorded write token, the host system regards the response message in the received response data stream as the response message generated by the smart card chip.

9. The method for transmitting and identifying data streams according to claim 8, wherein if the host system determines in step (f) that any of the extracted write tokens is inconsistent with the recorded write token, steps (d), (e) and (f) are repeated.

10. The method for transmitting and identifying data streams according to claim 8, wherein the size of each of the data segments is the size of a sector.

11. A memory storage apparatus, comprising:
a connector, configured to be coupled to a host system;
a rewritable non-volatile memory module, configured to store data;
a smart card chip, configured to generate a response message according to at least a portion of a received data stream; and
a memory controller, coupled to the connector, the rewritable non-volatile memory module and the smart card chip, the memory controller configured to control the operation of the rewritable non-volatile memory module and the smart card chip,
wherein the memory controller receives a write command from the host system through the connector, the write command is set to write the data stream to a logical address, and the data stream comprises a write token,
wherein the memory controller transmits at least a portion of the data stream to the smart card chip, and records the write token of the data stream,
wherein the memory controller receives the response message from the smart card chip,
wherein the memory controller generates a first verification code according to the response message and the write token,
wherein the memory controller generates a response data stream having a plurality of data segments, adds the response message and the first verification code into the response data stream and respectively adds the write token to each of the data segments, wherein the memory controller transmits the response data stream to the host system through the connector, wherein the host system sequentially transmits a plurality of read commands to the memory storage apparatus until the host system receives the response data stream from the memory storage apparatus, wherein the response data stream is transmitted to the host system in response to one of the read commands.

12. The memory storage apparatus according to claim 11, wherein the memory controller uses the response message and the write token to execute a hash function to generate the first verification code.

13. The memory storage apparatus according to claim 11, wherein the size of each of the data segments is the size of a sector.

14. The memory storage apparatus according to claim 11, wherein the memory controller determines whether any of the data streams received from the host system comprises a specific mark, and when any of the data streams received from the host system comprises the specific mark, the memory controller transmits at least a portion of the data stream having the specific mark to the smart card chip.

15. The memory storage apparatus according to claim 14, wherein the memory controller uses the specific mark, the response message and the write token to execute a hash function to generate the first verification code.

16. A memory controller configured for controlling a rewritable non-volatile memory module and a smart card chip, the memory controller comprising:
   a host interface, configured to be coupled to a host system;
   a memory interface, configured to be coupled to the rewritable non-volatile memory module;
   a smart card chip interface, configured to be coupled to the smart card chip; and
   a memory management circuit, coupled to the host interface, the memory interface and the smart card chip interface, wherein the memory management circuit receives a write command from the host system through the host interface, the write command is set to write a data stream to a logical address, and the data stream comprises a write token, wherein the memory management circuit transmits at least a portion of the data stream to the smart card chip through the smart card chip interface, and records the write token of the data stream, wherein the memory management circuit receives a response message from the smart card chip through the smart card chip interface, wherein the memory management circuit generates a response data stream having a plurality of data segments, adds the response message into the response data stream and respectively adds the write token to each of the data segments, wherein the memory management circuit transmits the response data stream to the host system through the host interface, wherein the host system sequentially transmits a plurality of read commands to the memory controller until the host system receives the response data stream from the memory controller, wherein the response data stream is transmitted to the host system in response to one of the read commands.

17. The memory controller according to claim 16, wherein the memory controller determines whether any of the data streams received from the host system comprises a specific mark, and when any of the data streams received from the host system comprises the specific mark, the memory management circuit transmits at least a portion of the data stream having the specific mark to the smart card chip.

18. The memory controller according to claim 16, wherein the size of each of the data segments is the size of a sector.

* * * * *